(12) United States Patent
Santoni et al.

(10) Patent No.: US 10,831,628 B2
(45) Date of Patent: Nov. 10, 2020

(54) HARDWARE LOCKSTEP CHECKING WITHIN A FAULT DETECTION INTERVAL IN A SYSTEM ON CHIP

(71) Applicant: Intel Corporation, Santa Clara, CA (US)

(72) Inventors: Umberto Santoni, Scottsdale, AZ (US); Rahul Pal, Bangalore (IN); Philip Abraham, Burlingame, CA (US); Mahesh Mamidipaka, Banglore (IN); C Santhosh, Banglore (IN)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 16/218,078

(22) Filed: Dec. 12, 2018

(65) Prior Publication Data

US 2019/0114243 A1 Apr. 18, 2019

(51) Int. Cl.
G06F 11/273 (2006.01)
G06F 11/16 (2006.01)
G06F 11/10 (2006.01)

(52) U.S. Cl.
CPC ........ G06F 11/273 (2013.01); G06F 11/1004 (2013.01); G06F 11/1629 (2013.01); G06F 11/1633 (2013.01); G06F 11/1641 (2013.01)

(58) Field of Classification Search
CPC . G06F 11/1004; G06F 11/1629; G06F 11/273
See application file for complete search history.

(56) References Cited

U.S. PATENT DOCUMENTS

| 6,055,660 A * | 4/2000 | Meaney ............... G06F 11/221 714/12 |
| 7,412,353 B2 * | 8/2008 | Borkar ............... G06F 1/3203 702/186 |
| 7,502,958 B2 * | 3/2009 | Michaelis ........... G06F 11/1641 712/31 |

(Continued)

FOREIGN PATENT DOCUMENTS

KR 10-20130119452 A 10/2013
KR 10-1560497 B1 10/2015

OTHER PUBLICATIONS

International Search Report and Written Opinion from International Patent Application No. PCT/US2019/063607, dated Mar. 19, 2020, 10 pages.

*Primary Examiner* — Joseph R Kudirka
(74) *Attorney, Agent, or Firm* — Spectrum IP Law Group LLC

(57) ABSTRACT

A method to check for redundancy in two or more data lines comprises receiving data on a first data line, computing a first cyclic redundancy check (CRC) value on the data of the first data line, performing an exclusive OR (XOR) function on the first CRC value with a stored memory value, and updating the stored memory value with a result of the XOR function, and repeating on additional data lines until a last line is processed such that an error is indicated if a final stored memory value is not zero. An apparatus to check that two cores are operating in lockstep comprises a first core comprising a first data checker, a second core comprising a second data checker, and a lockstep checker to compare an output of the first data checker with an output of the second data checker.

16 Claims, 13 Drawing Sheets

(56) References Cited

U.S. PATENT DOCUMENTS

| | | | | |
|---|---|---|---|---|
| 7,890,831 B2* | 2/2011 | Choate | ............ | G01R 31/31703 |
| | | | | 714/10 |
| 8,117,512 B2 | 2/2012 | Sorensen et al. | | |
| 8,359,529 B2 | 1/2013 | Maniwa et al. | | |
| 10,482,024 B2* | 11/2019 | Jiang | ................... | G06F 12/0842 |
| 2014/0115401 A1 | 4/2014 | Ito | | |
| 2017/0293561 A1* | 10/2017 | Dwiel | ................... | G06F 12/084 |
| 2018/0059180 A1* | 3/2018 | Rangachari | ...... | G01R 31/31901 |
| 2019/0114243 A1 | 4/2019 | Santoni et al. | | |

* cited by examiner

HARDWARE LOCKSTEP CHECKING WITHIN A FAULT DETECTION INTERVAL IN A SYSTEM ON CHIP

FIELD

The present disclosure generally relates to the field of electronics. More particularly, an embodiment relates to system on chip (SoC) devices and systems.

BACKGROUND

System on Chip (SoC) devices may have two or more cores for applications in which redundancy of hardware and data flows are utilized. In such redundant systems, transactions are duplicated wherein one read involves two read operations and one write involves two write operations and two cache lines are used. To ensure redundancy, a check may be performed to confirm that the data on both cache lines are identical. Doubling the amount of data to be processed for the redundancy check, however, means the amount of storage must be doubled. Data on the cache lines may be returned out of order and with no fixed time interval between the copies from two separate memory locations on a redundant mesh. Furthermore, data on the cache lines themselves may be split into two or more chunks which may be returned in any order.

In such redundant systems, the data is not stored until all of the chunks are accumulated in order to check and ensure that all copies of the data are identical. Such an approach, however, involves a large memory to store all the accumulated data, and also may take too long to accumulate and process the data in order to timely signal any errors before a specified Fault Detection Time Interval (FDTI). Furthermore, in order to ensure that cycle accurate lockstep is maintained between two cores, the outputs of the cores must be checked as being identical every cycle. Any mismatch between the core outputs also must be signaled before the FDTI. Checking the entire outputs of two cores, however, may involve too many wires to route for comparing all data on all the output wires.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
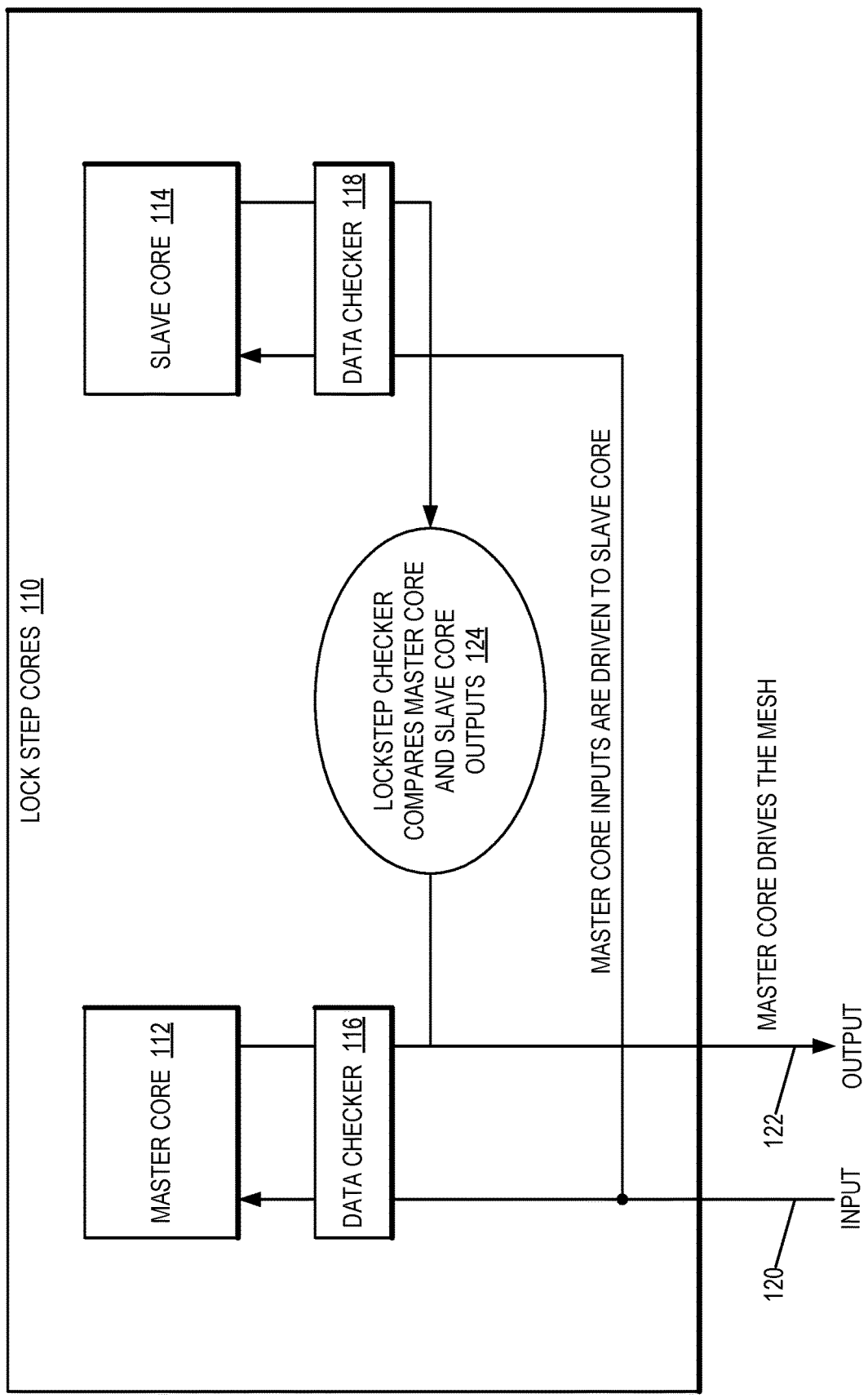
FIG. 1 is a diagram of a System on Chip (SoC) having two cores with data checkers and a lockstep checker in accordance with one or more embodiments.

Referring now to FIG. 1, a diagram of a System on Chip (SoC) having two cores with data checkers and a lockstep checker in accordance with one or more embodiments will be discussed. As shown in FIG. 1, SoC 110 may include a master core 112 and a slave core 114 that are to operate in lockstep wherein the operations of master core 112 are duplicated by slave core for redundancy. Although FIG. 1 shows an example of a two core SoC 110, other arrangements of SoC 112 may be utilized with more or fewer cores, and the scope of the claimed subject matter is not limited in this respect. In one or more embodiments, one or more of the cores may include a corresponding data checker such as data checker 116 for master core 112 and data checker 118 for slave core 114. The data checkers are used to check for data mismatches on cache lines in some embodiments, and in other embodiments the data checkers may be extended to any fabric that returns redundant copies of transactions that are to be efficiently compart in order to ensure that both copies are correct.

In some embodiments, SoC 110 may have an input 120 to provide inputs to master core 112. The inputs of master core 112 also may be driven to slave core 114. SoC 110 also may have an output 122 wherein outputs from master core 112 may be utilized to drive the mesh of a central processing unit (CPU), for example as shown in and described with respect to FIG. 6 below, although the scope of the claimed subject matter is not limited in this respect. In order to ensure that the master core 112 and slave core 114 are in lockstep, a lock step checker 124 may receive the outputs from both of the cores to compare the output of master core 112 with the output of slave core 114.

In or more embodiments, data checker such as data checker 116 and data checker 118 may check between the Master cache line and Slave Cache line. Each cache line is 64 bytes (B), or 512 bits (b), and arrives in two chunks of 256b for the upper cache line and the lower cache line. The arrival order on the cache lines is not guaranteed to be in any particular order. There may be storage available for 64-70 bits. A mismatch between the Master cache line and the Slave cache line results in a fatal error.

A redundant mesh data check may check that data on the Master cache line=data on the Slave cache line by performing a cyclic redundancy check on all four of the cache lines (Master upper and lower cache lines and Slave upper and lower cache lines):

{crc64_Mupper,crc64_Mlower}={crc64_Supper, crc64_Slower}

Effectively, if all the four CRC (2*2 half cachelines) are exclusive ORed (XORed) together, the final vector should be 0 for a redundancy check pass:

Mupper XOR Mlower XOR Supper XOR Slower=64'b0 for a passing case. In such an operation, the redundancy check structure is initialized to 0. When a 1st half cache line arrives from any of the redundant halves:
 Compute 64b CRC; and
 XOR into existing value in redundancy check structure entry.
When 2nd half cache line arrives from any of the redundant halves:
 Invert or shift data bus: the 2 halves from same side masking each other out due to stuck-at faults or same data being read twice;
 Compute 64b CRC; and
 XOR into existing value in redundancy check structure entry
When the last expected data half line is being XORed, check if final result is 0. If the final result is 0, then the data check passes. Otherwise, the data check fails. An example of a CRC pipeline for data checker 116 or data checker 118 is shown in and described with respect to FIG. 2, below.

Figure 2:
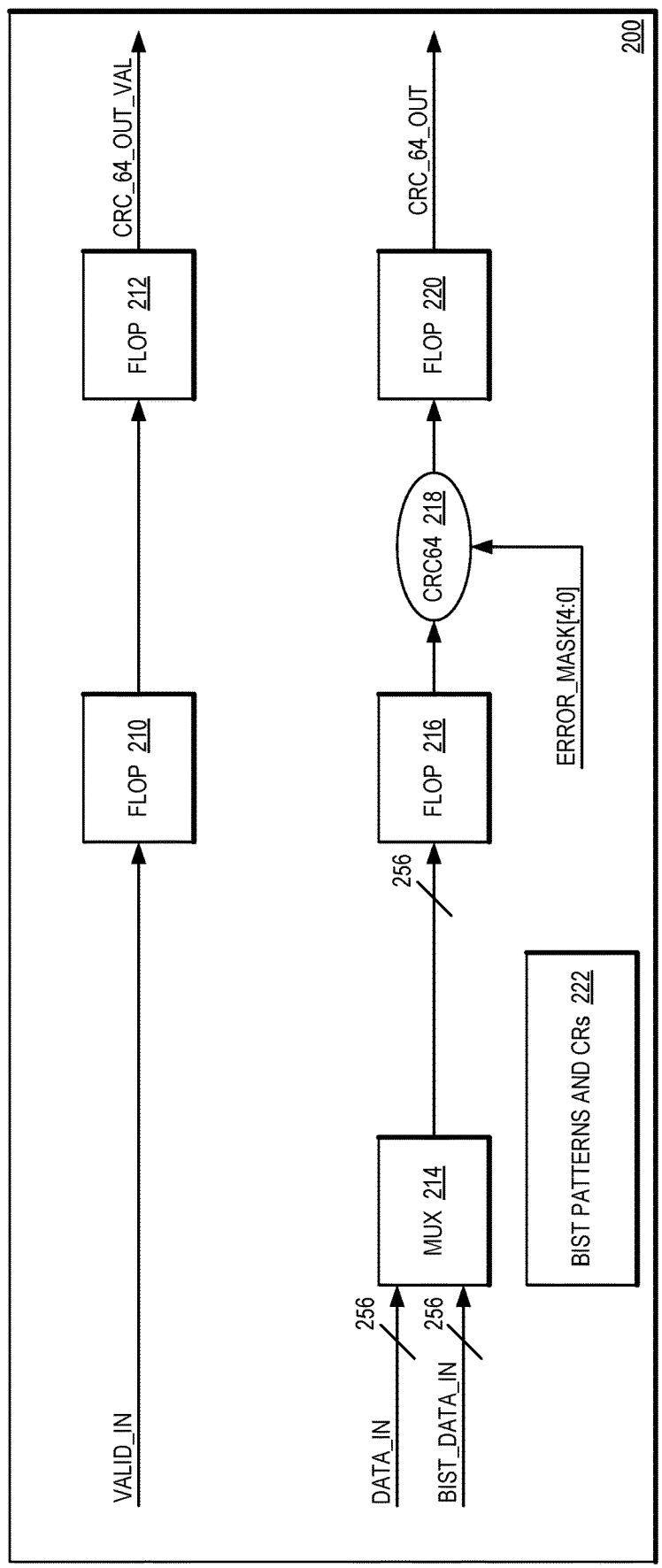
FIG. 2 is a diagram of a data checker in accordance with one or more embodiments.

Referring now to FIG. 2, a diagram of a data checker in accordance with one or more embodiments will be discussed. As shown in FIG. 2, data checker 200 may represent the CRC pipeline of data checker 116 or data checker 118 of FIG. 1. Valid input data (VALID-IN) may be provided to flip-flop (FLOP) 210 and then to flip-flop (FLOP) 212 to provide valid CRC output data (CRC_64_OUT_VAL) which may be 64 bits in one or more embodiments. The data to be checked (DATA_IN) comprising 256 bits may be provided to flip-flop (FLOP) 216, which may be multiplexed with built in self-test test data (BIST_DATA_IN) with multiplexer (MUX) 214 for testing purposes. The output of flop-flop 216 may be provided to a 64b CRC checker 218 to provide its output to flop-flop (FLOP) 220 to provide a 64b CRC output (CRC_64_OUT). The CRC checker 218 may include a 4:0 error inject mask (ERROR_MASK[4:0]). Built in self-test (BIST) patterns and cyclic redundancy codes (CRs) may be stored in a memory 222.

In one or more embodiments, the data checker CRC pipeline 200 may operate to interleave the data bits such that b[0]^b[4]^b[8] . . . , b[1]^[b5]^b[9], . . . and so on. A data checker finite state machine (FSM) may operate by adding a five state FSM per Queue entry to track stored the CRC value state.
 3'b000—stored value is 64'b0
 3'b001—stored value is 64b CRC of first half cache line
 3'b010—stored value of 2nd half cache line CRC XOR with stored value
 3'b011—stored values of 3rd half cache line CRC XOR with stored value
 When FSM is 2'b11 then XOR 4th half cache line CRC with stored result and check for all 0 in result Write back all 0 to entry and clear FSM state to 3'b00 on no error
Write back result of XOR and move FSM state to 3'b111 on an error. All other states are illegal In one or more embodiments, the data checker CRC polynomials may be as shown in Table 1, below.

TABLE 1

Data Checker CRC Polynomials

| | |
|---|---|
| CRC-64-ECMA-182 | CRC-64-ECMA-182 $x64 + x62 + x57 + x55 + x54 + x53 + x52 + x47 + x46 + x45 + x40 + x39 + x38 + x37 + x35 + x33 + x32 + x31 + x29 + x27 + x24 + x23 + x22 + x21 + x19 + x17 + x13 + x12 + x10 + x9 + x7 + x4 + x + 1$ |
| CRC-64-ISO | $x64 + x4 + x3 + x + 1$ |

In one or more embodiments, data checker debug hooks may be implemented as follows.
Add micro break point on mismatch of checker
Error Injection
 Flip a bit in the CRC code that is generated. See below.
BIST
 Add the following registers (UCFS refers to Uncore Functional Safety)
  UCFS_TEST_CTRL_STATUS
   Valid bit—set by hardware when the BIST is complete. Cleared on reset or by SW.
   Start bit—set by SW to initiate BIST. Cleared on reset or by HW when setting the Valid bit
   Inject_CRC_ERR[4:0]— inject an error on the first CRC computed if bit is set on CRC[63, 47, 31, 15, 0]. Cleared after injection.
  UCFS_TEST_RESULT
   64b register that contains the value of the BIST (see next page)
   Writeable by HW and SW, Readable by SW
In one or more embodiments, the data checker BIST mat be implemented as follows.
 SW sets the initial value of UCFS_TEST_RESULT. Default after reset is 64'b0.
 SW initiates test by writing to UCFS_TEST_CTRL_STATUS by setting START bit and clearing VALID bit
 Hardware sequences 16 known patterns—that are 256 bits each through the checker.
 The results are XORED with the contents of UCFS_TEST_RESULT and written back to UCFS_TEST_RESULT.
 At the end of the test sequence the VALID bit is set in the UCFS_TEST_CTRL_STATUS and the START bit is cleared.
 SW reads the UCFS_TEST_RESULT and compares against an expected value to determine pass or fail.

Figure 3:
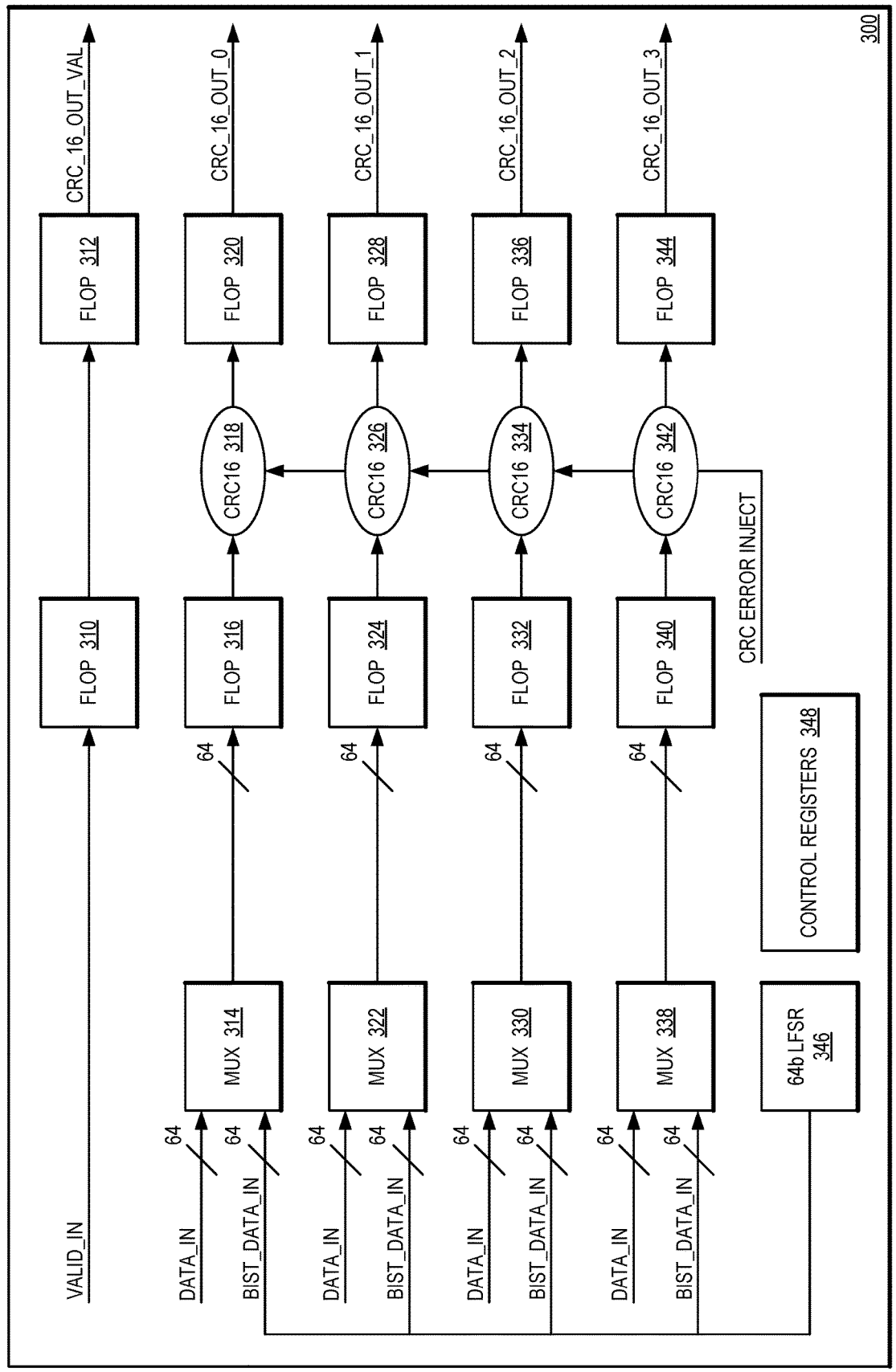
FIG. 3 is a diagram of an alternative data checker in accordance with one or more embodiments.

Referring now to FIG. 3, a diagram of an alternative data checker in accordance with one or more embodiments will be discussed. The data checker 300 of FIG. 3 is substantially similar to the data checker 200 of FIG. 2 except that data checker 200 utilizes four 16b CRC checkers 318, 326, 334, and 342 instead of a 64b CRC checker 218 to produce four 16b CRC outputs (CRC 16 OUT 0, CRC 16 OUT 1, CRC 16 OUT 2, and CRC 16 OUT 3) from flip-flops 316, 320, 324, 329, 332, 336, 340, and 344. Flip-flops 310 and 312 provide a 16b valid output (CRC 16 OUT_VAL), and four multiplexers (MUX) 314, 322, 330, and 338 receive 64b data inputs. The BIST data is stored in a 64b linear feedback shift register (LFSR) 346 and the CRC bit patterns are stored in control registers 348.

Figure 4A:
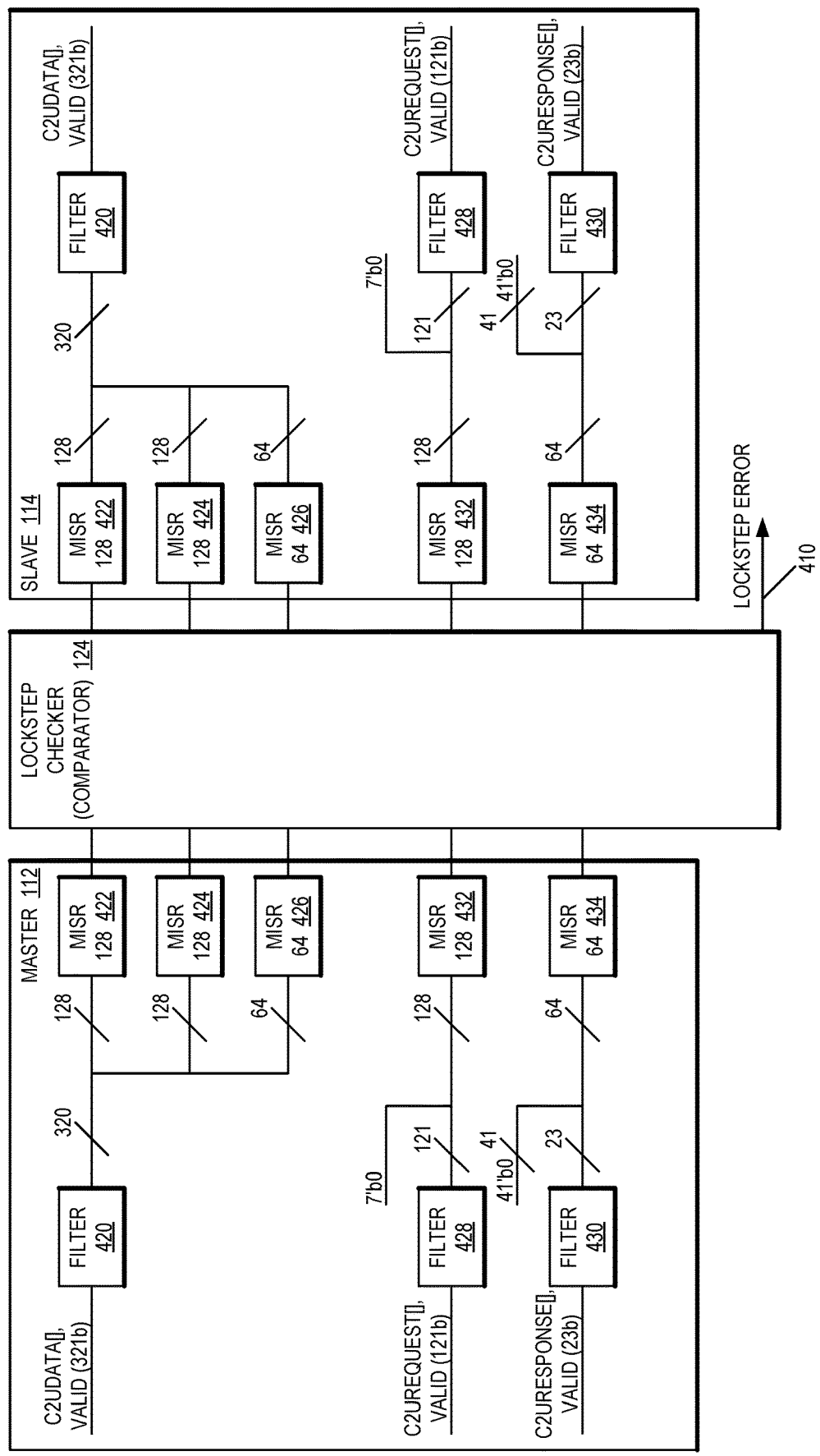
FIGS. 4A, 4B, and 4C are diagrams of a lockstep checker, an example circuit for the lockstep checker for two cores of a system on chip (SoC), and an example circuit for a multiple input shift register (MISR), respectively, in accordance with one or more embodiments.
Figure 4B:
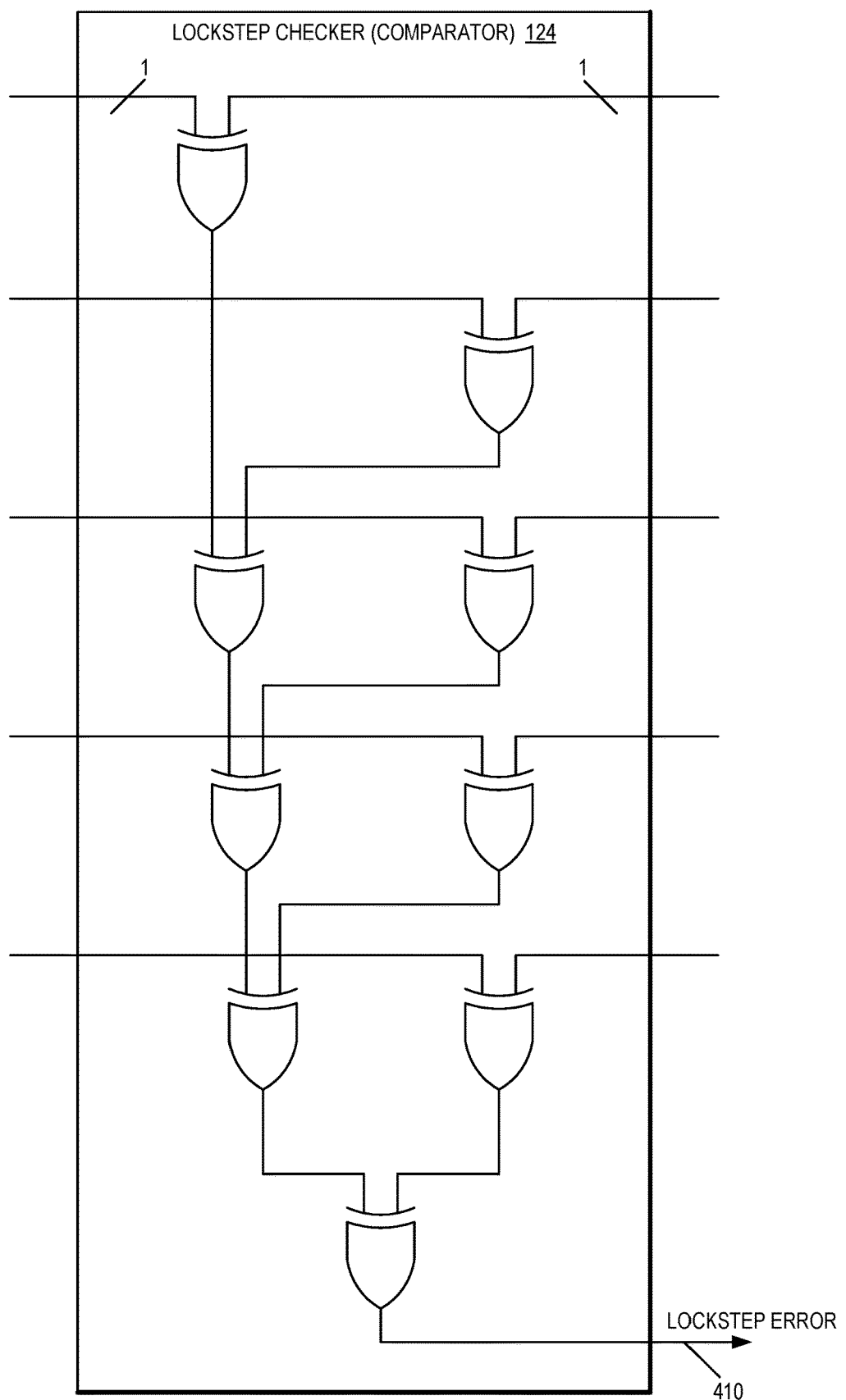
Figure 4C:
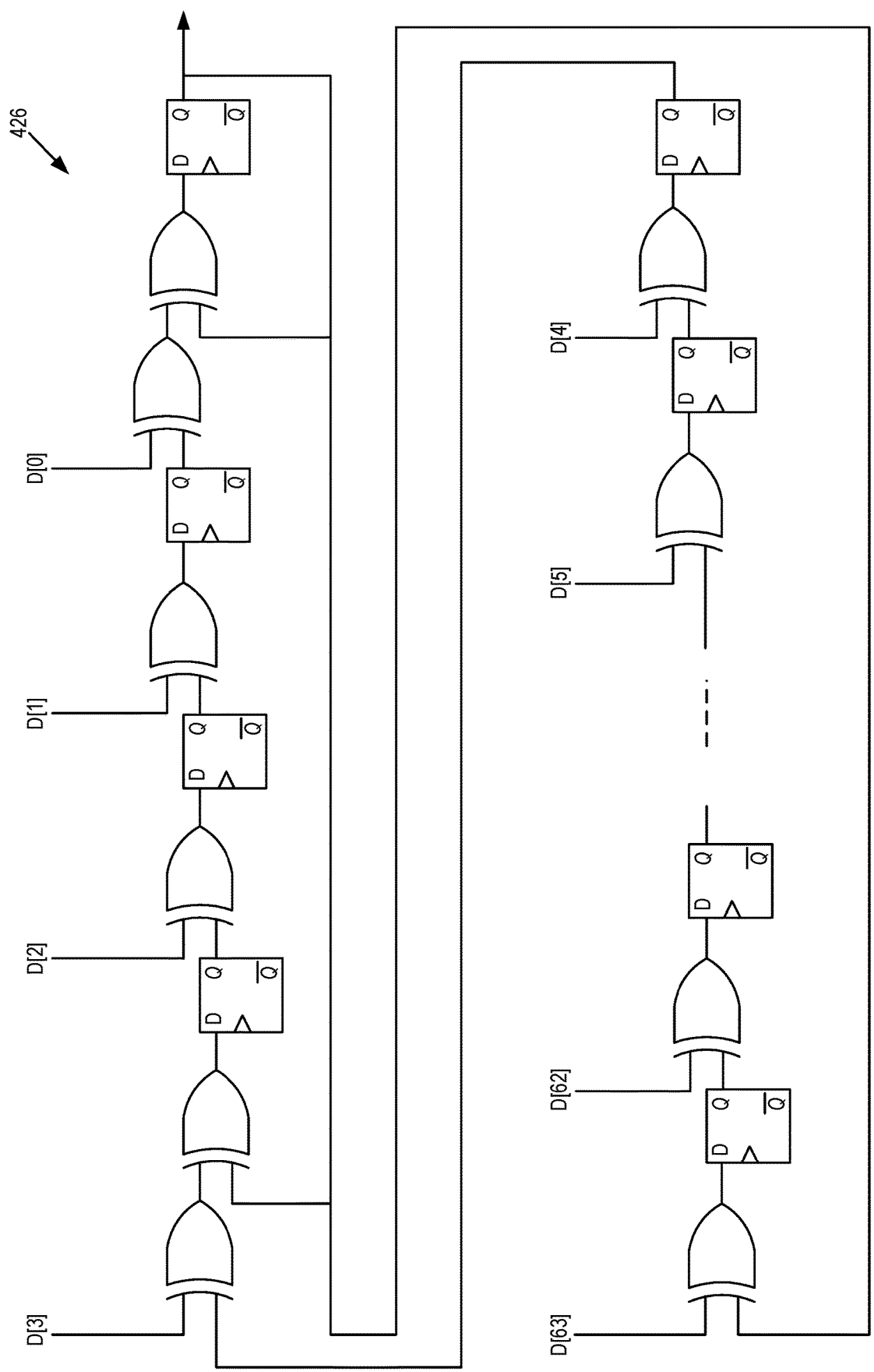

Referring now to FIG. 4A, FIG. 4B, and FIG. 4C, diagrams of a lockstep checker, an example circuit for the lockstep checker for two cores of a system on chip (SoC), and an example multiple input shift register (MISR) circuit, respectively, in accordance with one or more embodiments will be discussed. Similar to the arrangement of FIG. 1, the lockstep checker 124 may be coupled with master core 112 and slave core 114 to provide a lockstep error output 410 to check that the two cores are operating in lockstep. Such a checking scheme may be extended to any two blocks operating in lockstep to be checked on a cycle boundary in an efficient manner. In order to ensure that both cores in the lockstep core SoC 110 are executing in parallel, the following constraints may be applied. First, checking should be done on a cycle basis. Second, since wires are a premium between cores, the lockstep checker 124 should consume as little wire tracks as possible. Third, the lockstep checker 124 should have the ability to be checked for faults. Fourth, a filter may be used to remove incomparable data from IDI or to drive known data when there is no data issued from the cores. Fifth, the lockstep checking scheme should have low probability of aliasing to ensure that errors are not masked. It should be noted that the above constraints are merely example properties of a lockstep checker and/or a lockstep checking scheme, and the scope of the claimed subjected matter is not limited in these respects.

In one or more embodiments, master core 112 may include one or more filters for command and control unit (C2U) buses. A filter is utilized to ensure that every cycle the output of the cores that are to be compared have consistent data. In some embodiments depending on the transaction, certain fields are don't care so the values may not be consistent between master core 112 and slave core 114. In order to ensure consistency, for such don't care bits the filter drives a 0, and when there is no valid bit the filter drives a 0. Thus, consistency may be achieved with the filter by driving don't care bits to a zero value. In some embodiments the core outputs are not relevant depending upon the transaction being issued wherein it may be the case that the non-relevant outputs are inconsistent across the lock step pairs. Furthermore, checking may be performed every cycle and when there is no traffic from the cores known data may be used rather than stopping and restarting the checker only when there are valid transactions from the core.

For C2UReq, C2URsp, C2UData:
AND the valid bit with the payload towards HWL checker logic (making the bus going towards checker logic 0 if not valid)

A first embodiment of the lockstep checker 124 may operate as follows.
(64-70 wires between master-slave)
1 64b CRC computed on C2U data bus
1 64b CRC computed on (C2Ureq+C2Ursp) bus
XOR both together for final 64b CRC compare
Pass final 64b output from master to slave and match against slave output
The slave output should be latency matched to master
Valid bits for C2Ureq, C2Udata and C2Ursp must be passed and compared in raw form A second embodiment of the lockstep checker 124 as shown in detail in FIG. 4A may utilize less than ten wires between mater core 112 and slave core 114. The C2Data, C2URequest and C2UResponse buses first go through a filter, filter 420, filter 428, and filter 430, respectively, to ensure that every bit has a known value. In some embodiments depending on the transaction, certain fields are don't care so the values need not be consistent between master core 112 and slave core 114. In the don't care bits the filter drives a 0. When there is no valid bit the filter drives a 0. The outputs of the filter drives into a series of multiple input shift registers (MISR's) (128b/64b) such as MISR 422, MISR 424, MISR 426, MISR 432, and MISR 434. The most significant bit (MSB) of each of the MISRs of the master core 112 is fed to a comparator lockstep checker 124 to detect a mismatch with the MISR outputs of the slave core 114. The slave core 114 mirrors the filters and MISRs of the master core 112 and provides the MSBs of each of the MISRs of the slave core 114 to the comparator lockstep checker 124. When the cores are running at a higher frequency shifting out the 128b in the indicated Fault Detection Time Interval (FDTI), which typically is in the millisecond range, should be easily accomplished. The comparator lockstep checker 124 performs a single bit compare every cycle. The MISRs on both the master core 112 and the slave core 114 may be started simultaneously.

FIG. 4B shows an example circuit for the comparator lockstep checker 124. As shown in FIG. 4B, the outputs from the MISRs of the master core 112 and the slave core 114 are XORd together through a series of XOR gates and provided as the lockstep checker 124 error output 410. If the MISR outputs from both the master core 112 and the slave core 114 match, then the lockstep error output 410 will have a value of 0. Otherwise, the value will be 1 which indicates an error or mismatch.

In one or more embodiments, for a test mode, a write may be broadcast from the Test Control Unit or Block (e.g., control registers 348) to enable the lockstep checker 124. As a test mode at key off, a known pattern could be driven into the filters, and the resulting signature could be checked. In such an arrangement, the wires to be shifted for comparison effectively may be reduced to two wires. Valid bits for C2U req, C2Udata and C2Ursp may be passed and compared in raw form.

In one or more embodiments, for debug cases a function to disable and to enable the lockstep checker 124 may be added, and a function to clear and restart the MISRs and the lockstep checker 124 also may be added, including the ability to reset and initialize the lockstep check from the Test Control Unit or Block. Upon a mismatch between the cores as determined by the lockstep checker, a micro break point may be triggered.

The control registers per lockstep checker may include the following:
LKST_TEST_CTRL
LKST_TEST_PTRN
LKST_TEST_STATUS_0
LKST_TEST_STATUS_1
LKST_TEST_STATUS_ACC In order to test the lockstep checker 124, a first test may be as follows.
Configure all the MISRs in shift register mode. Defined in LKSTP_TEST_CTRL
Bypass all XOR gates and feedback loop.
Serially feed in LKST_TEST_PTRN to the least significant bit (LSB) of the MISR.
Read out 16 bits from each 128b MISR and 8b from each 64b MISR into LKSTP_TEST_STATUS_0/1
The register value should match expected value
Alternatively, a second test of the lockstep checker 124 may be as follows.
Load LKST_TEST_PTRN into the parallel inputs of all the MISRs. Defined in LKSTP_TEST_CTRL
Drive this before the filter.
Clock MISR for about $2^{16}$ cycles.

Read out 16 bits from each 128b MISR and 8b from each 64b MISR into LKSTP_TEST_STATUS_0/1

Load the lock step checker output into LKST_TEST_STATUS_ACC

Accumulate the transitions of the checker output in a 16b counter

The register value should match expected value

FIG. 4C shows the details of MISR 64 circuit used by master core 112 or slave core 114, for example MISR 426. The circuit of MISR 426 may comprise a series of XOR gates and D flip-flops connected as shown. For the MISR 128 circuits, the arrangement of FIG. 4C may be extended to have 128 inputs. The CRC 64 Polynomial as shown in Table 1, above, may be used by the MISR circuit in a manner similar as a CRC checker.

Figure 5A:
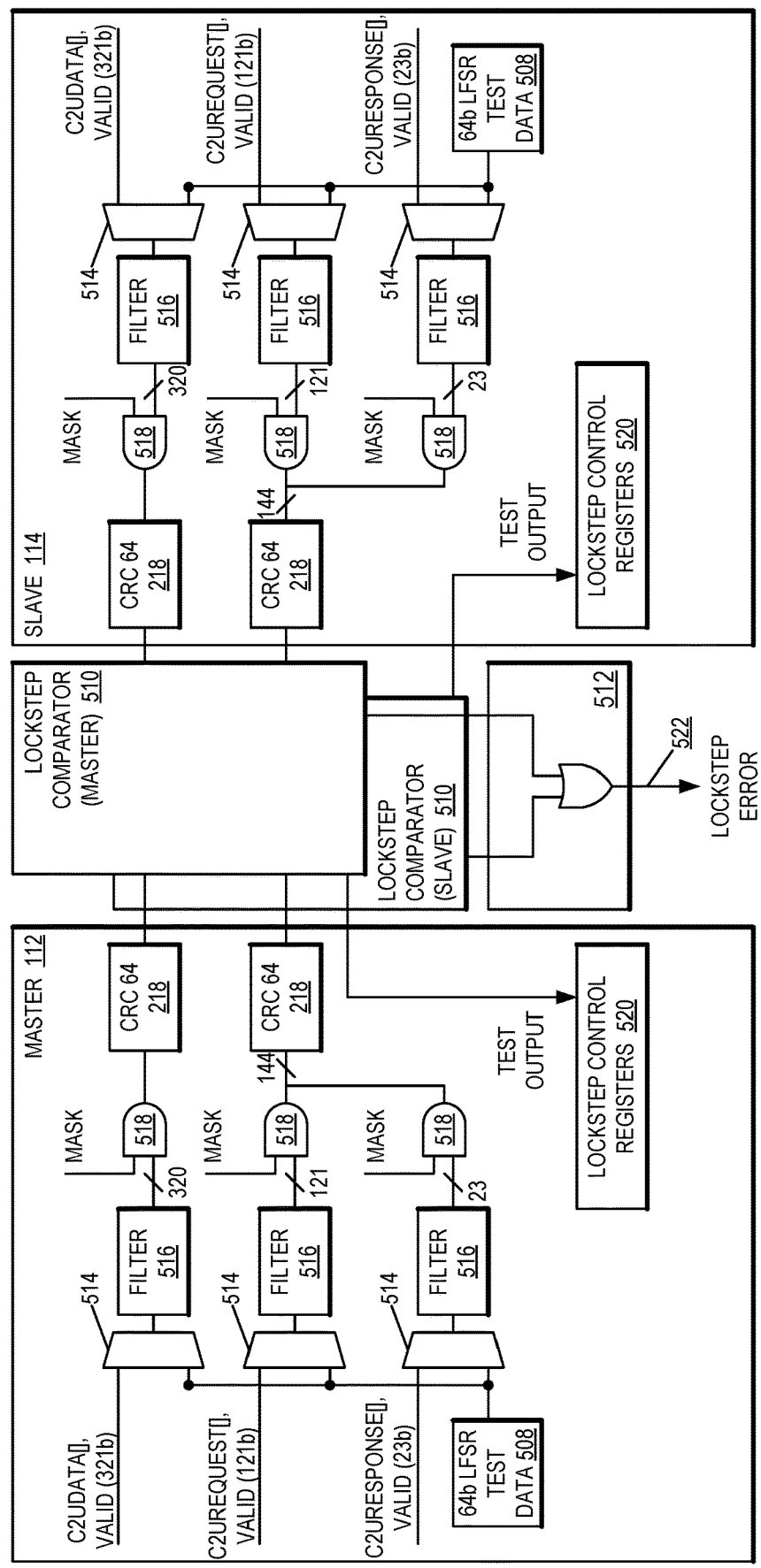
FIGS. 5A, 5B, and 5C are diagrams of an alternative lockstep checker, an example circuit for the alternative lockstep checker, and a diagram of the lockstep checker with skid on the output in accordance with one or more embodiments.
Figure 5B:
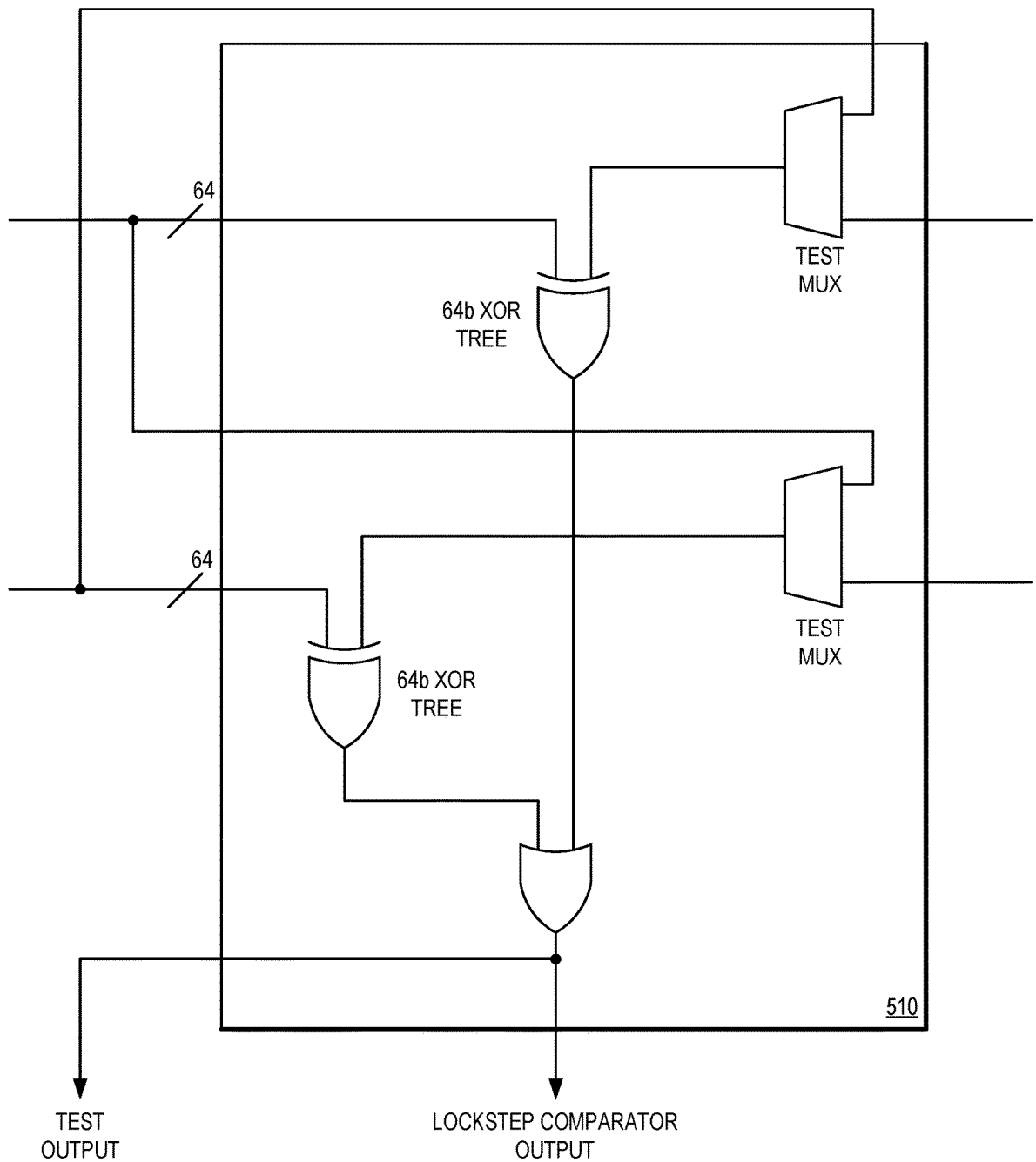
Figure 5C:
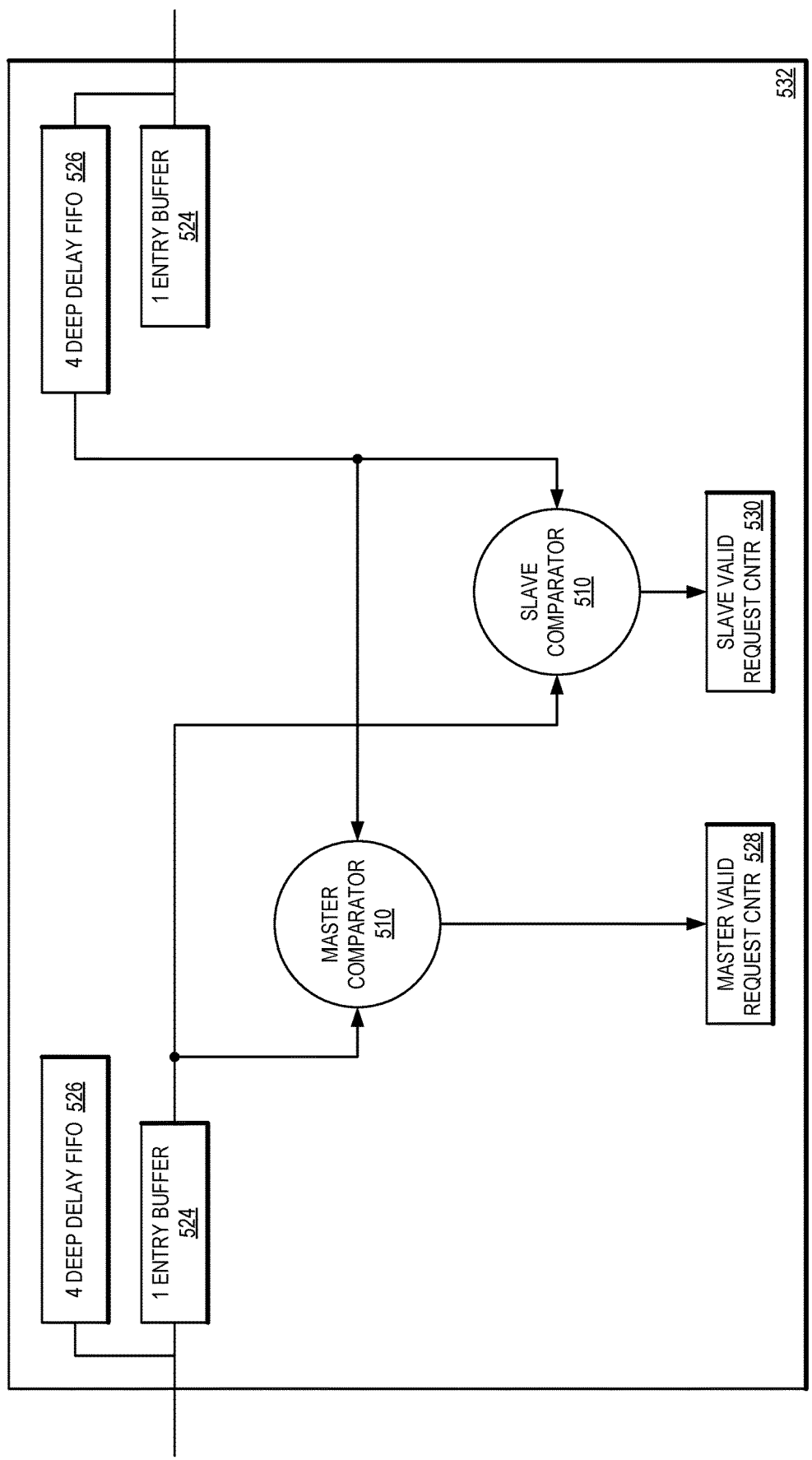

Referring now to FIGS. 5A, 5B, and 5C, diagrams of an alternative lockstep checker, an example circuit for the alternative lockstep checker, and a diagram of the lockstep checker with skid on the output in accordance with one or more embodiments will be discussed. The circuitry for lockstep checking of master core 112 and slave core 114 as shown in FIG. 5A is substantially similar to the circuitry as shown in FIG. 4A with the following changes. The master and slave cores each have a respective lockstep checker 510 having outputs provided to an OR gate 512 to provide lockstep error output 522. The C2U inputs are provided to filters 516 and CRC checkers 218 instead of the MISRs of FIG. 4A. For testing, 64b LFSR test data may be provided to the filters 516 via multiplexers 514, and the outputs of the filters 516 may be provided through AND gates to control each path via MASK signals. The outputs of each of the lockstep checkers 510 may provide test outputs of lockstep control registers 510 in each of the cores. FIG. 5B shows the circuitry for the lockstep checkers 510 wherein the outputs of the 64b CRC checkers 218 are passed through 64b XOR trees to provide each lockstep checker comparator output. Test multiplexers (MUXs) are provided for testing purposes.

FIG. 5C shows a lockstep checker with skid on the output. The lockstep checker 532 of FIG. 5C may be duplicated for data, request, and response inputs. The lockstep checker 532 may include a 4 deep delay first in first out (FIFO) buffer. The FIFO 526 may be 64b per entry via 1 entry buffer 524 if CRC checkers are used or 1 bit per entry if MISRs are used. The depth of FIFO 526 may be adjustable to accommodate skid. FIG. 5C shows a 4 cycle skid between the master core 112 and the slave core 114. In addition, each of the master comparators and the slave comparators 510 include a valid request counter 528 (master) and a valid request counter 530 (slave) which may be a 5b counter incremented for every master request, or for every slave request, and reset when there is a match. The counters may signal a lockstep error when the counter overflows.

Figure 6:
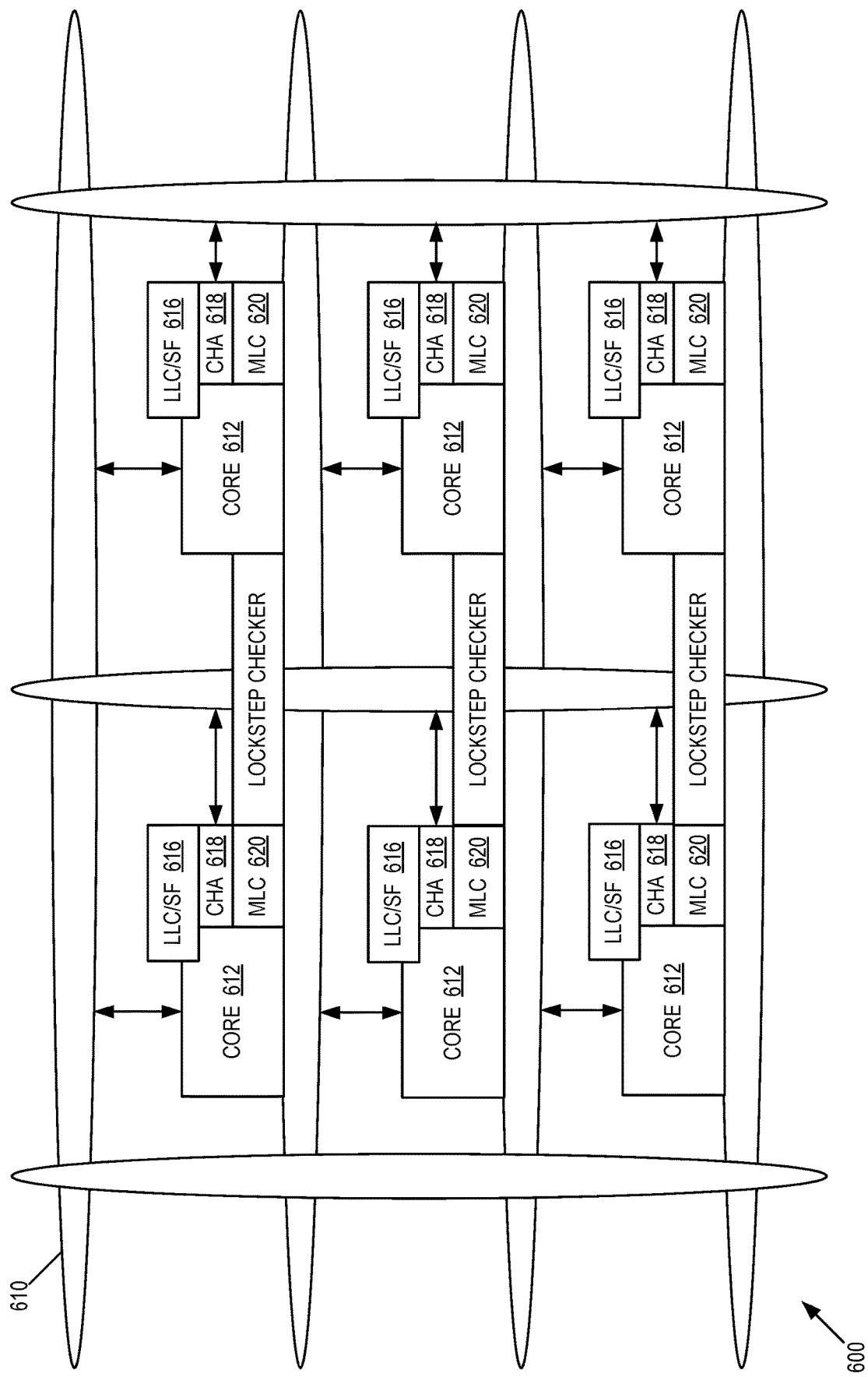
FIG. 6 is a diagram of a lockstep checker deployed in a central processing unit in accordance with one or more embodiments.

Referring now to FIG. 6, a diagram of a lockstep checker deployed in a central processing unit in accordance with one or more embodiments will be discussed. As shown in FIG. 6, a central processing unit (CPU) 600 or processor or system may include a mesh interconnect architecture comprising a mesh 610 to connect multiple cores in the CPU 600. It should be noted that FIG. 6 does not include all of the elements of CPU 600 and is to illustrate the coupling of two or more cores 612 via a lockstep checker 614 in accordance with one or more embodiments as discussed herein, for example in an arrangement that is capable of being replicated multiple times across the mesh interconnect grid to provide a multi-core structure for CPU 600. In the embodiment shown, each core tile in the grid may include a core 612, a last-level cache/snoop filter (LLC/SF) 616, a caching and home agent (CHA) 618, and/or mid-level cache (MLC) 620, although the scope of the claimed subject matter is not limited in these respects. Such a multicore mesh architecture of CPU 600 may comprise an Intel XEON processor or the like, although the scope of the claimed subject matter is not limited in this respect.

Figure 7:
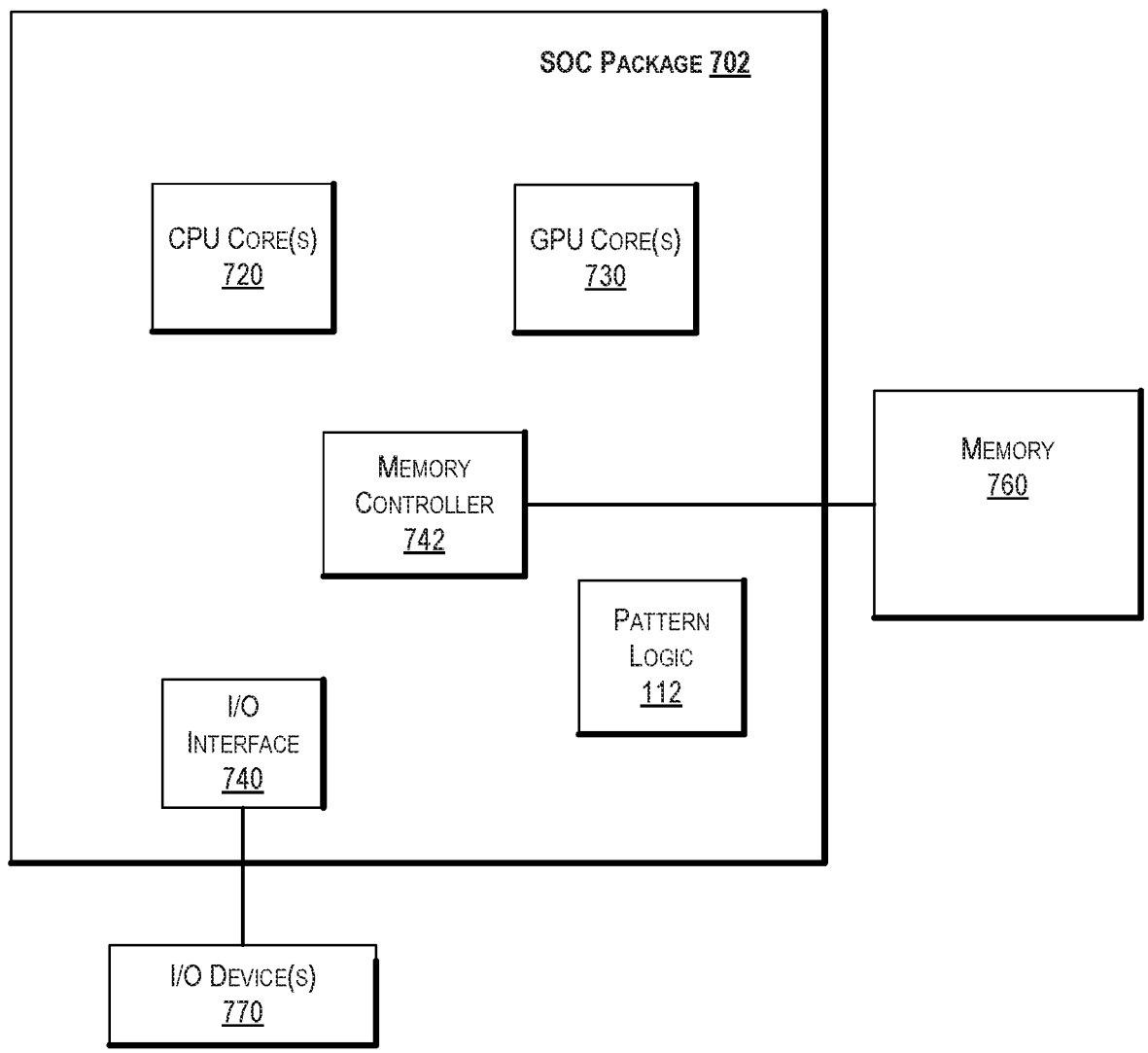
FIG. 7 illustrates a block diagram of a system on chip (SOC) package in accordance with an embodiment.

FIG. 7 illustrates a block diagram of a system on chip (SOC) package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 660 (or a portion of it) can be integrated on the SOC package 702.

The I/O interface 740 may be coupled to one or more I/O devices 770, e.g., via an interconnect and/or bus such as discussed herein with reference to other figures. I/O device (s) 770 may include one or more of a keyboard, a mouse, a touchpad, a display, an image/video capture device (such as a camera or camcorder/video recorder), a touch screen, a speaker, or the like.

Figure 8:
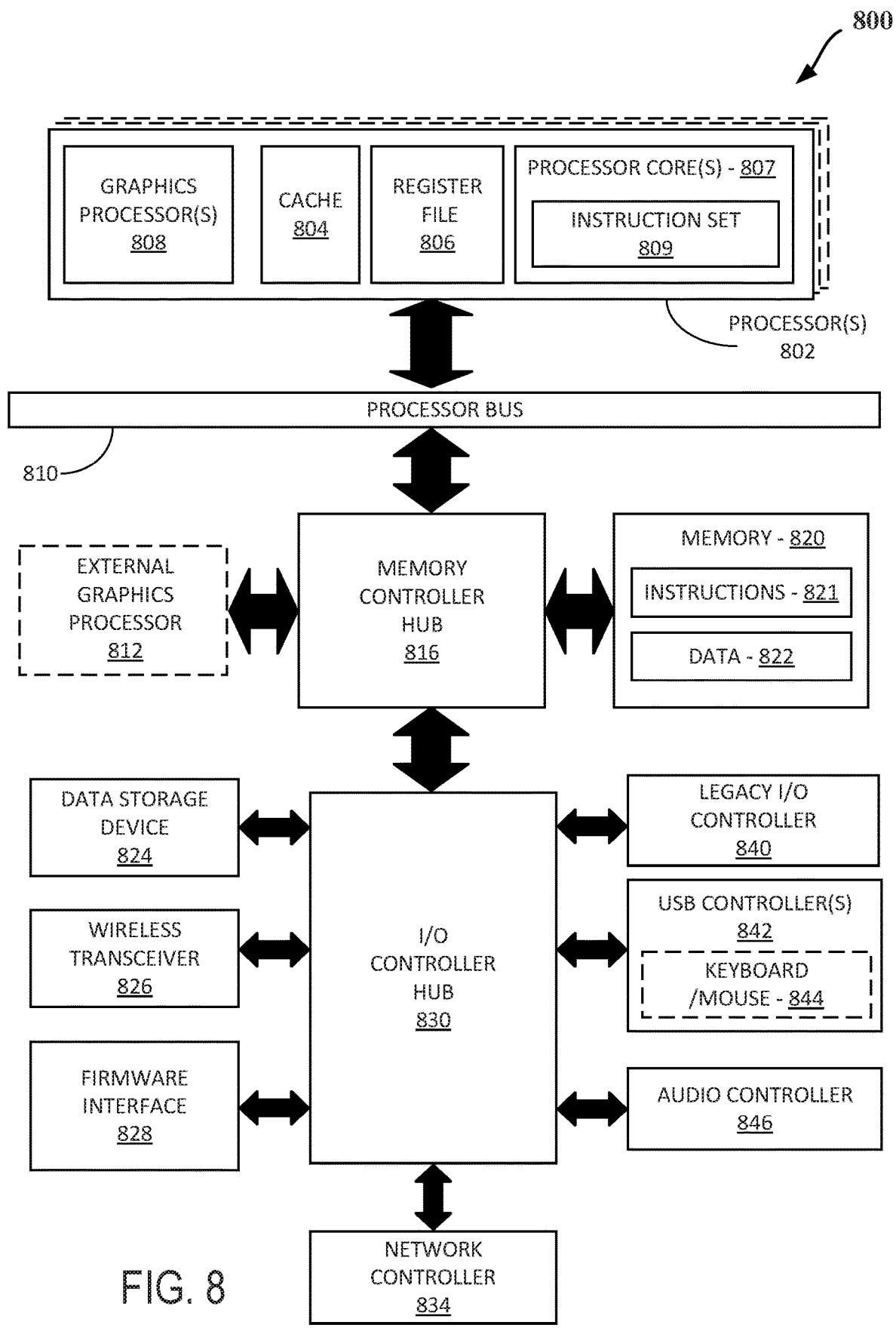
FIG. 8 is a block diagram of a processing system according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW).

Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 702 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary "hub" system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
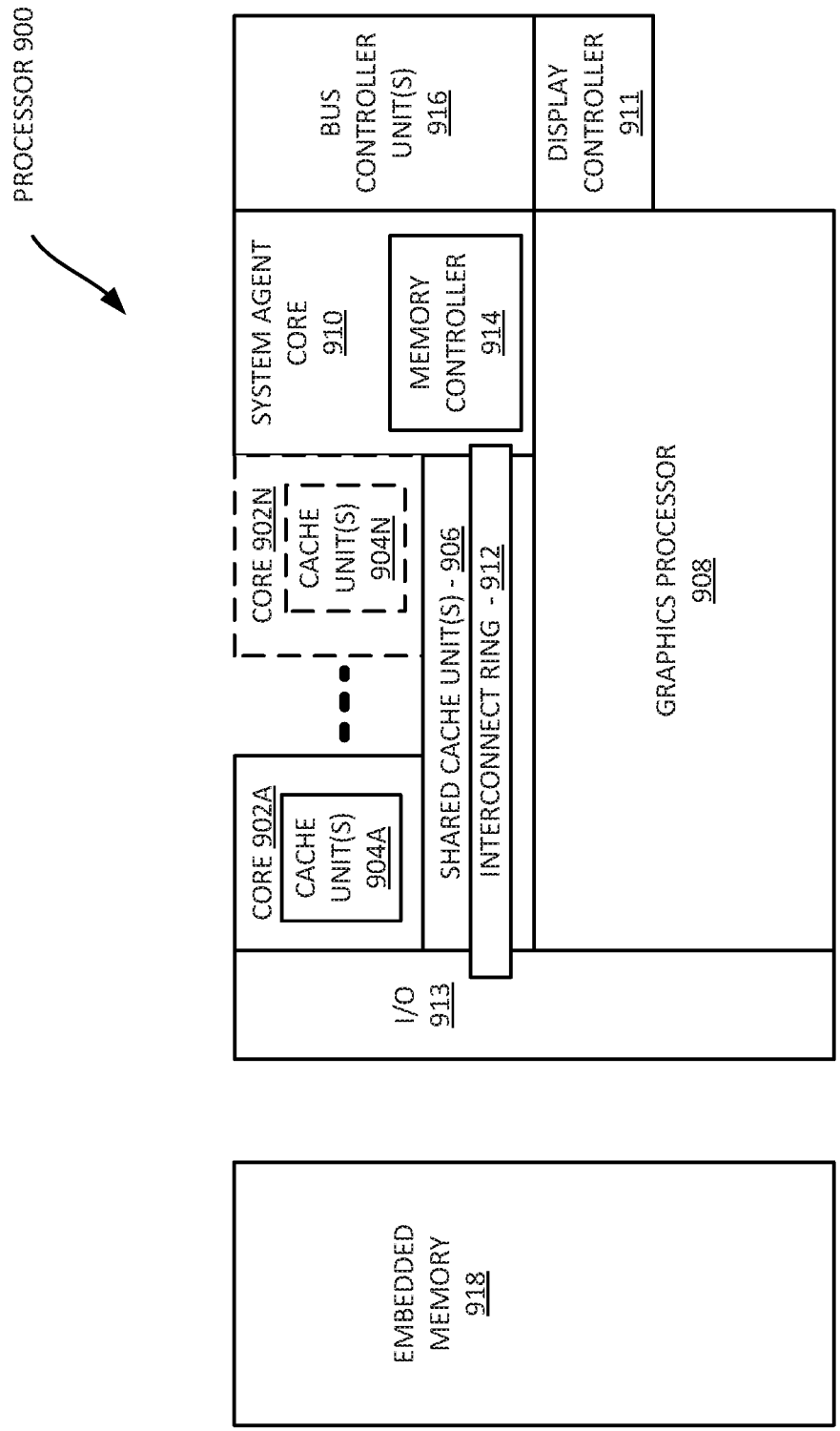
FIG. 9 is a block diagram of a processor having one or more processor cores, an integrated memory controller, and an integrated graphics processor in accordance with one or more embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 808 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

The following examples pertain to further embodiments. Example one includes a method to check for redundancy in two or more data lines, the method comprising receiving data on a first data line, computing a first cyclic redundancy check (CRC) value on the data of the first data line, performing an exclusive OR (XOR) function on the first CRC value with a stored memory value, and updating the stored memory value with a result of the XOR function, wherein said receiving, computing, performing, and updating is performed on additional data lines until a last line is processed such that an error is indicated if a final stored memory value is not zero. Example two may include the subject matter of example one or any of the examples described herein, wherein the two or more data lines comprise cache lines. Example three may include the subject matter of example one or any of the examples described herein, wherein the two or more data lines comprise cache lines each comprising two half lines, and wherein said receiving, said computing, said performing is applied to individual half lines. Example four may include the subject matter of example one or any of the examples described herein, wherein data on a half cache line is inverted or shifted prior to said computing to prevent two half cache lines of a same cache masking each other out, where masking may refer to the inadvertent changing of valid bit values, or otherwise preventing the valid bit values from being read, although the scope of the claimed subject matter is not limited in this respect. Example five may include the subject matter of example one or any of the examples described herein, wherein the error is indicated prior to a specified Fault Detection Time Interval (FDTI). Example six may include the subject matter of example one or any of the examples described herein, wherein said performing is executed an even number of times.

Example seven includes an apparatus to check that two cores are operating in lockstep, comprising a first core comprising a first data checker, a second core comprising a second data checker, and a lockstep checker to compare an output of the first data checker with an output of the second data checker, wherein the output of the first data checker comprises a first bit and the output of the second data checker comprises a second bit, and the lockstep checker is to perform an exclusive OR (XOR) function on the first and second bits, wherein the lockstep checker is to indicate that the two cores are operating in lockstep if a result of the XOR function is zero. Example eight may include the subject matter of example seven or any of the examples described herein, wherein the first core comprises a master core and the second core comprises a slave core. Example nine may include the subject matter of example seven or any of the examples described herein, wherein the first data checker and the second data checker comprise a multiple input shift registers (MISRs). Example ten may include the subject matter of example seven or any of the examples described herein, wherein the first data checker and the second data checker comprise cyclic redundancy checkers (CRCs). Example eleven may include the subject matter of example seven or any of the examples described herein, wherein the first core includes a first filter coupled to the first data checker and the second core includes a second filter coupled to the second data checker, wherein the first filter and the second filter operate to ensure that an output of the first core and an output of the second core have consistent data every cycle. Example twelve may include the subject matter of example seven or any of the examples described herein, wherein the first bit and the second bit comprise a most significant bit (MSB). Example thirteen may include the subject matter of example seven or any of the examples described herein, wherein the first bit and the second bit comprise a least significant bit (LSB). Example fourteen may include the subject matter of example seven or any of the examples described herein, wherein the lockstep checker comprises a master lockstep checker for the master core and a slave lockstep checker for the slave core.

Example 15 includes a system, comprising two or more tiles, a mesh to interconnect the two or more tiles, wherein a first core of a first tile is coupled with a second core of a second tile via the mesh interconnect, a first core comprising a first data checker, and a lockstep checker to couple with the first core of the first tile and the second core of the second tile, wherein the lockstep checker is to compare an output of the first core with an output of the second core such that the lockstep checker is to indicate that the first core is operating in lockstep with the second core if a result of comparison is zero. Example sixteen may include the subject matter of example fifteen or any of the examples described herein, wherein the lockstep checker is to compare a first bit of the output of the first core with a second bit of the output of the second core with an exclusive OR (XOR) function on the first bit and the second bit. Example seventeen may include the subject matter of example fifteen or any of the examples described herein, wherein the first bit and the second bit comprise a most significant bit (MSB). Example eighteen may include the subject matter of example fifteen or any of the examples described herein, wherein the first bit and the second bit comprise a least significant bit (LSB). Example nineteen may include the subject matter of example fifteen or any of the examples described herein, wherein the output of the first core and the output of the second core comprise cache lines of a last-level cache (LLC) or a mid-level cache (MLC). Example twenty may include the subject matter of example fifteen or any of the examples described herein, wherein the cache lines comprise an upper half cache line and a lower half cache line.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method to check for redundancy in two or more data lines from a functional safety core of a multicore System on Chip (SoC), the method comprising:
  receiving data on a first data line of the functional safety core;
  computing a first cyclic redundancy check (CRC) value on the data of the first data line;
  performing an exclusive OR (XOR) function on the first CRC value with a stored memory value; and
  updating the stored memory value with a result of the XOR function;
  wherein said receiving, computing, performing, and updating is performed on additional data lines of the functional safety core until a last line is processed such that an error is indicated if a final stored memory value is not zero.

2. The method of claim 1, wherein the two or more data lines comprise cache lines.

3. The method of claim 1, wherein the two or more data lines comprise cache lines each comprising two half lines, and wherein said receiving, said computing, and said performing are applied to individual half lines.

4. The method of claim 3, wherein data on a half cache line is inverted or shifted prior to said computing to prevent two half cache lines of a same cache masking each other out.

5. The method of claim 1, wherein the error is indicated prior to a specified Fault Detection Time Interval (FDTI).

6. The method of claim 1, wherein said performing is executed an even number of times.

7. An apparatus to check that two cores are operating in lockstep, comprising:
  a first core comprising a first data checker;
  a second core comprising a second data checker; and
  a lockstep checker to compare an output of the first data checker with an output of the second data checker, wherein the output of the first data checker comprises a first bit and the output of the second data checker comprises a second bit, and the lockstep checker is to perform an exclusive OR (XOR) function on the first and second bits;
  wherein the lockstep checker is to indicate that the two cores are operating in lockstep if a result of the XOR function is zero;
  wherein the first core includes a first filter coupled to the first data checker and the second core includes a second filter coupled to the second data checker, wherein the first filter and the second filter operate to ensure that an output of the first core and an output of the second core have consistent data every cycle.

8. The apparatus of claim 7, wherein the first core comprises a master core and the second core comprises a slave core.

9. The apparatus of claim 7, wherein the first data checker and the second data checker comprise multiple input shift registers (MISRs).

10. The apparatus of claim 7, wherein the first data checker and the second data checker comprise cyclic redundancy checkers (CRCs).

11. The apparatus of claim 7, wherein the first bit and the second bit comprise a most significant bit (MSB).

12. The apparatus of claim 7, wherein the first bit and the second bit comprise a least significant bit (LSB).

13. The apparatus of claim 8, wherein the lockstep checker comprises a master lockstep checker for the master core and a slave lockstep checker for the slave core.

14. A system, comprising:
  two or more tiles;
  a mesh to interconnect the two or more tiles, wherein a first core of a first tile is coupled with a second core of a second tile via the mesh interconnect; and
  a lockstep checker to couple with the first core of the first tile and the second core of the second tile;
  wherein the lockstep checker is to compare an output of the first core with an output of the second core such that the lockstep checker is to indicate that the first core is operating in lockstep with the second core if a result of comparison is zero;
  wherein the lockstep checker is to compare a first bit of the output of the first core with a second bit of the output of the second core with an exclusive OR (XOR) function on the first bit and the second bit, wherein the first bit and the second bit comprise a most significant bit (MSB) or a least significant bit (LSB).

15. The system of claim 14, wherein the output of the first core and the output of the second core comprise cache lines of a last-level cache (LLC) or a mid-level cache (MLC).

16. The system of claim 15, wherein the cache lines comprise an upper half cache line and a lower half cache line.

* * * * *